US011987056B2

(12) United States Patent
Osaki

(10) Patent No.: US 11,987,056 B2
(45) Date of Patent: May 21, 2024

(54) LIQUID EJECTION HEAD

(71) Applicant: CANON KABUSHIKI KAISHA, Tokyo (JP)

(72) Inventor: Yasuhiko Osaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/858,714

(22) Filed: Jul. 6, 2022

(65) Prior Publication Data

US 2023/0013309 A1 Jan. 19, 2023

(30) Foreign Application Priority Data

Jul. 9, 2021 (JP) ................................ 2021-114338

(51) Int. Cl.
*B41J 2/175* (2006.01)

(52) U.S. Cl.
CPC .................................... *B41J 2/175* (2013.01)

(58) Field of Classification Search
CPC ...... B41J 2/175; B41J 2/1404; B41J 2/14145; B41J 2/14024; B41J 2202/19; B41J 2202/20; B41J 2202/07; B41J 2202/12
See application file for complete search history.

(56) References Cited

U.S. PATENT DOCUMENTS 10,391,767 B2 * 8/2019 Osaki .................. B41J 2/14024
11,117,374 B2 * 9/2021 Nakagawa ............ B41J 2/1404
11,179,948 B2 * 11/2021 Hammura ........... B41J 2/14024

FOREIGN PATENT DOCUMENTS

JP 4018577 B2 12/2007

* cited by examiner

*Primary Examiner* — An H Do
(74) *Attorney, Agent, or Firm* — Canon U.S.A., Inc. IP Division

(57) ABSTRACT

Provided is a liquid ejection head including plural liquid chambers arranged in rows, each liquid chamber being provided with an orifice configured to eject liquid filling the liquid chamber and an ejection energy generating element, wherein the liquid ejection head includes: a liquid supply path that extends in a direction that the plural liquid chambers are arranged and individually communicates with the plural liquid chambers; a direction change flow path that communicates with the liquid supply path and extends in a direction transverse to the liquid supply path; and a common supply flow path that communicates with the direction change flow path and extends in a direction transverse to the direction change flow path, such that the direction change flow path includes a body portion and at least one grooved flow path, which is narrower than the body portion.

21 Claims, 14 Drawing Sheets

LIQUID EJECTION HEAD

BACKGROUND

Field of the Disclosure

The present disclosure relates to a liquid ejection head that ejects liquid such as ink.

Description of the Related Art

As a liquid ejection head example, Japanese Patent No. 4018577 describes an ink-jet recording head. This ink-jet recording head includes an ink ejection circuit part ejecting ink and a flow path introducing the ink to the ink ejection circuit part. The flow path includes a vertical part extending vertically and a horizontal part that extends horizontally from the lower end of the vertical part and leads to a supply port. A grooved flow path narrower than the flow path is continuously provided for the side wall of the vertical part and the upper section of the horizontal part. The upper section of the horizontal part slopes down from the vertical part side. The ink flows through the grooved flow path even when air bubbles collect in the horizontal part and block the flow path. The ink flow through the grooved flow path serves to move air bubbles collecting in the horizontal part.

Some liquid ejection heads include a direction change flow path. This type of liquid ejection head includes: a direction change flow path that communicates with a common supply flow path and extends in a direction transverse to the common supply flow path; and a liquid supply path that communicates with the direction change flow path and extends in a direction transverse to the direction change flow path. The liquid supply path communicates with plural liquid chambers, each of which is provided with an ejection orifice. The direction change flow path is provided with an opening through which the liquid is supplied to the liquid supply path.

In the aforementioned liquid ejection head, air bubbles may collect in the direction change flow path and block the same. However, the ink-jet recording head described in Japanese Patent No. 4018577 is not configured such that liquid can be supplied to a supply port (the opening) when the direction change flow path is blocked with air bubbles.

SUMMARY

An objective of the present disclosure is to provide an ink-jet recording head that is able to continue to supply liquid to the opening when an air bubble blocks the flow path.

To achieve the aforementioned object, a liquid ejection head according to an aspect of the disclosure is a liquid ejection head including plural liquid chambers arranged in rows, each liquid chamber being provided with an ejection orifice configured to eject liquid filling the liquid chamber and an ejection energy generating element. The liquid ejection head includes: a liquid supply path that extends in a direction that the plural liquid chambers are arranged and individually communicates with the plural liquid chambers; a direction change flow path that communicates with the liquid supply path and extends in a direction transverse to the liquid supply path; and a common supply flow path that communicates with the direction change flow path and extends in a direction transverse to the direction change flow path. The direction change flow path includes a body portion and at least one grooved flow path. The body portion includes a first lateral wall provided with at least one opening through which liquid is supplied to the liquid supply path. The grooved flow path extends in the first lateral wall along a direction that the body portion extends. The grooved flow path is narrower than the body portion.

A liquid ejection head according to another aspect of the disclosure includes: a liquid supply path communicating with plural ejection chambers each including an ejection orifice configured to eject liquid; and a flow path that includes in a lateral wall, an opening through which the liquid is supplied to the liquid supply path and that extends in a direction transverse to the liquid supply path. The flow path has one closed end and includes in the lateral wall, a grooved flow path communicating with the opening. The grooved flow path is configured to supply the liquid to the opening by capillary action.

Further features of the present disclosure will become apparent from the following description of exemplary embodiments with reference to the attached drawings.

DESCRIPTION OF THE EMBODIMENTS

Hereinafter, an embodiment of the disclosure is described in detail with reference to the drawings. The constitutional elements described in the embodiment are just examples and will not limit the scope of the present disclosure.

A liquid ejection head according to an embodiment of the disclosure is described.

Description of Recording Apparatus

Firstly, a recording apparatus on which the liquid ejection head of the embodiment is mounted is described.

Figure 1:
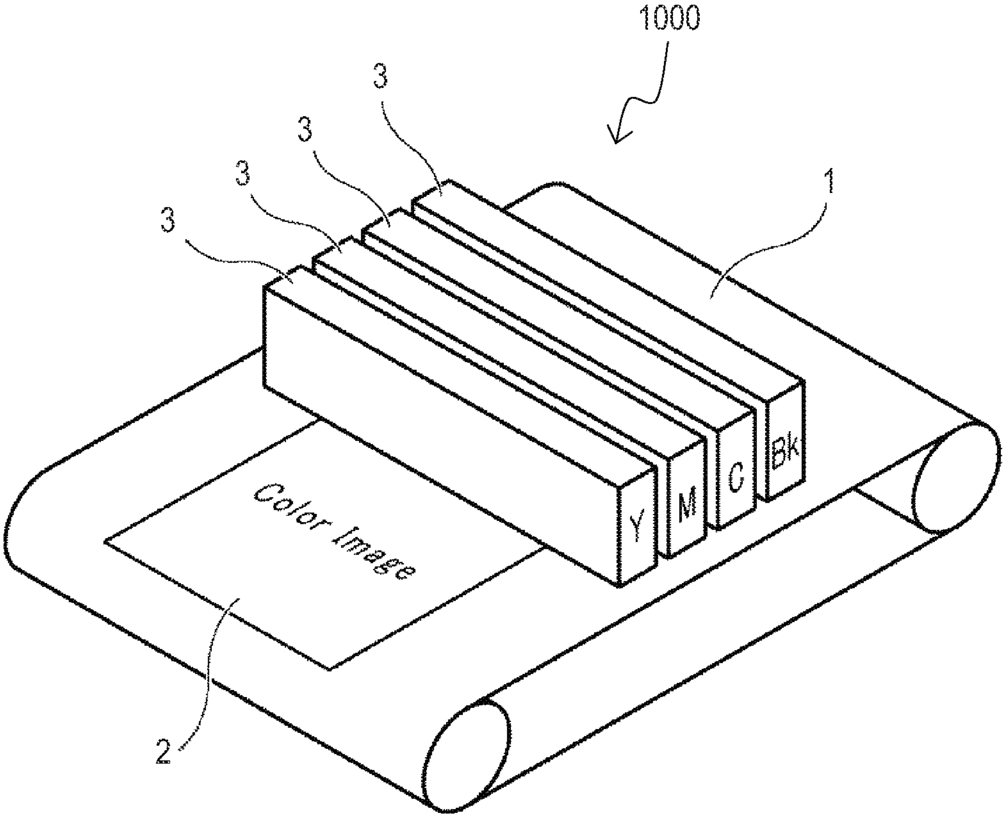
FIG. 1 is a schematic diagram for explaining the general configuration of a recording apparatus.

FIG. 1 is a schematic diagram for explaining the general configuration of the recording apparatus. A recording apparatus 1000 includes a transportation part 1 transporting a recording medium 2 and liquid ejection heads 3 ejecting liquid, such as ink, toward the recording medium 2. In this example, the recording apparatus 1000 ejects liquid of four colors, including cyan, magenta, yellow, and black (also referred to as C, M, Y, and Bk), for full-color recording. The liquid ejection heads 3 include four liquid ejection heads 3 for single-color use corresponding to the four colors, which are aligned in the transporting direction of the recording medium 2.

Each liquid ejection head 3 includes plural ejection orifice rows. The number of ejection orifice rows is 20, for example (see later description of FIG. 8A). Properly allocating recording data to the plural ejection orifice rows implements very fast recording. Furthermore, when any one of the ejection orifices fails to eject liquid, the liquid ejection head 3 complementarily ejects ink through an ejection orifice that is located at the corresponding position in another row in the transporting direction of the recording medium 2. This improves the reliability of the liquid ejection heads 3. Each liquid ejection head 3 is supplied with liquid from a liquid supply system through a liquid connection part. The liquid ejection heads 3 are individually electrically coupled to an electric controller. The electric controller transmits electric power and ejection control signals to the liquid ejection heads 3. The liquid and electric signal routes in each liquid ejection head 3 are described later.

Description of Liquid Ejection Head Configuration

Figure 2A:
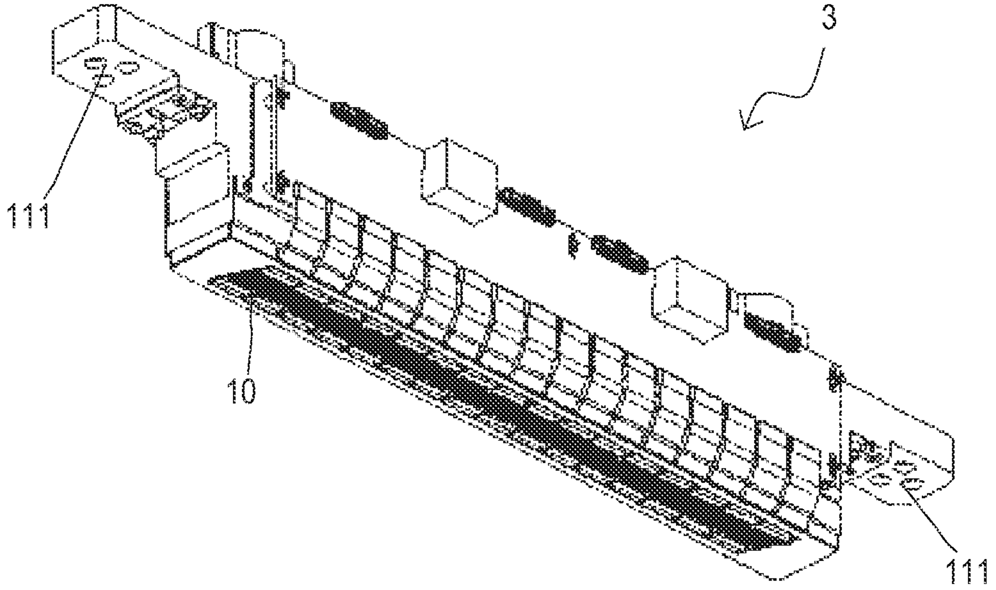
FIGS. 2A and 2B are perspective views of a liquid ejection head according to an embodiment of the present disclosure.
Figure 2B:
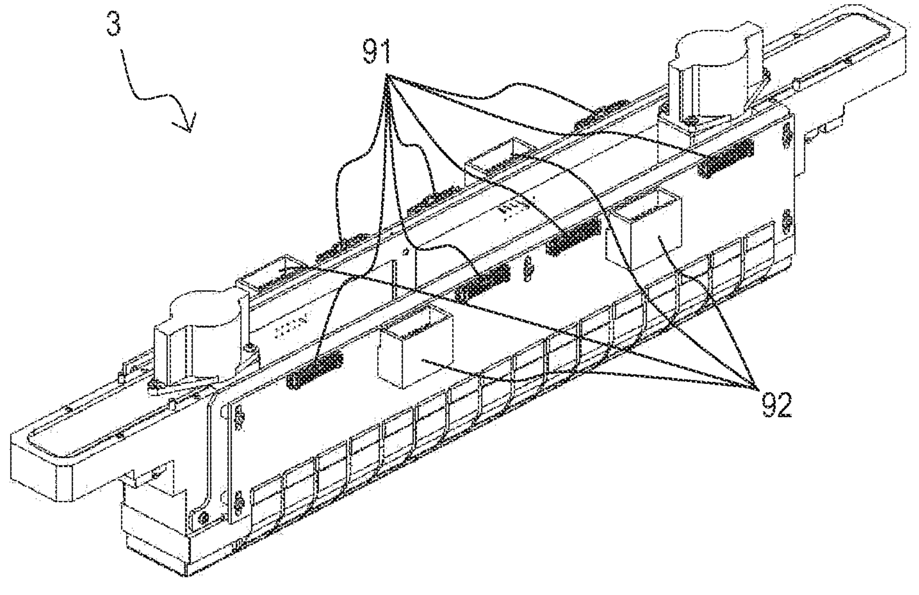

FIGS. 2A and 2B are perspective views of the liquid ejection head 3 of the embodiment. FIG. 2A is a view of the liquid ejection head 3 as seen from diagonally beneath a liquid-ejecting side thereof. FIG. 2B is a view of the liquid ejection head 3 as seen from diagonally above the opposite side thereof to the liquid-ejecting side.

As illustrated in FIGS. 2A and 2B, the liquid ejection head 3 is an ink-jet line recording head capable of recording with liquid of one color. The liquid ejection head 3 includes plural recording element substrates 10. For example, the plural recording element substrates 10 include sixteen recording element substrates 10, which are linearly arranged along the longitudinal axis of the liquid ejection head 3. The liquid ejection head 3 includes liquid connection sections 111, signal input terminals 91, and power supply terminals 92. In this example, since the liquid ejection head 3 includes many ejection orifice rows, the signal input terminals 91 and power supply terminals 92 are located in both sides of the liquid ejection head 3. This reduces voltage drop and signal transmission delay caused in the wiring part provided for the recording element substrates 10.

Figure 3:
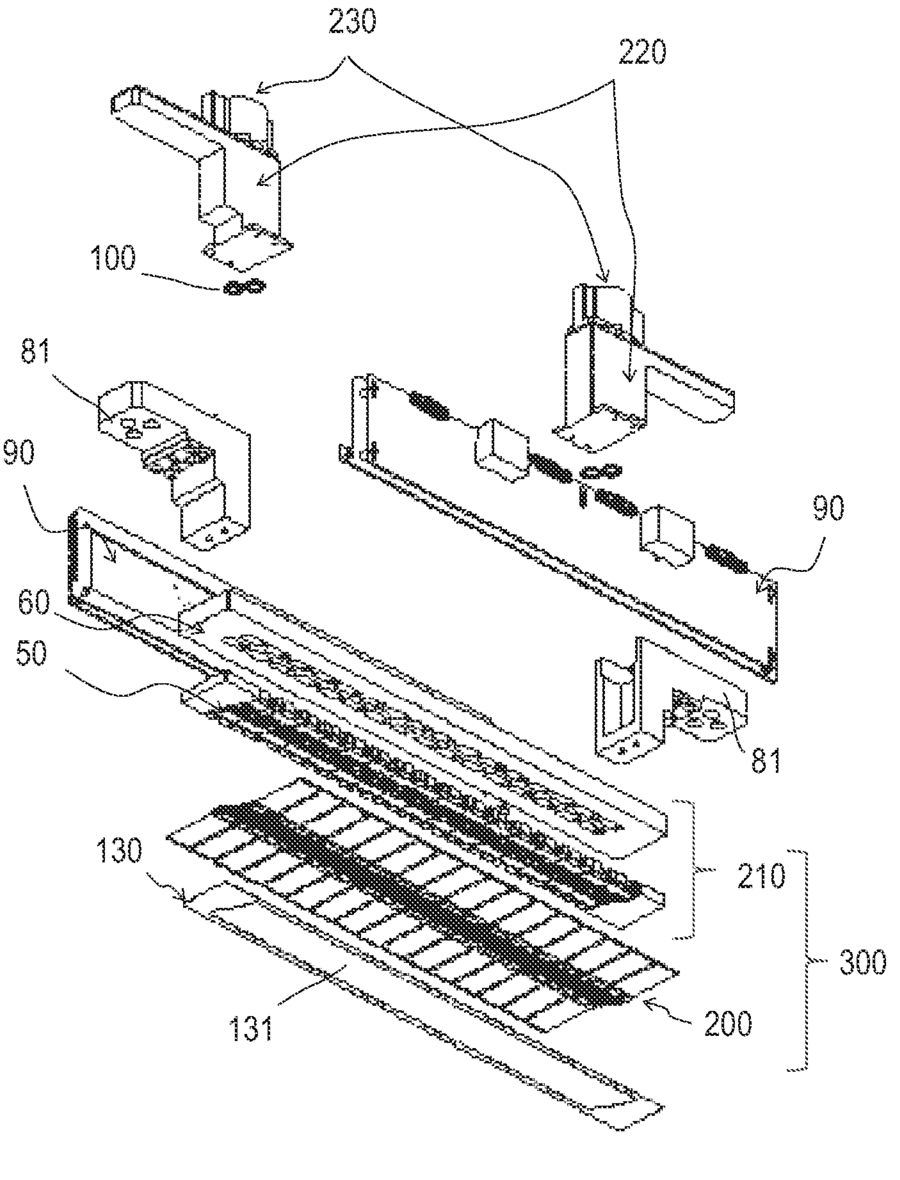
FIG. 3 is an exploded, perspective view of the liquid ejection head illustrated in FIGS. 2A and 2B.

FIG. 3 is an exploded, perspective view of the liquid ejection head 3. FIG. 3 separately illustrates by function, the components and units constituting the liquid ejection head 3. The liquid ejection head 3 includes a liquid ejection unit 300, support units 81 supporting the liquid ejection unit 300, electric wiring boards 90, and liquid supply units 220.

The liquid ejection unit 300 includes a flow path member 210 and an array of plural ejection modules 200. The flow path member 210 is composed of a first flow path member 50 and a second flow path member 60. The ejection face side of the array of plural ejection modules 200 is covered with a cover member 130 provided with a window 131. The window 131 is configured to expose the recording element substrates 10.

The numbers of the support units 81, electric wiring boards 90, and liquid supply units 220 are individually two. The support units 81 are coupled to the respective ends of the second flow path member 60. To the support units 81, the respective liquid supply units 220 and the electric wiring boards 90 are attached. Each liquid supply unit 220 includes a negative-pressure control unit 230 and contains a filter (not illustrated). The negative-pressure control unit 230 provided for one of the liquid supply units 220 and the negative-pressure control unit 230 provided for the other liquid supply unit 220 are configured to control pressure to different negative pressures (relatively high and low negative pressures).

In the example of FIG. 3, the negative-pressure control unit 230 on the high-pressure side is provided at one end of the liquid ejection head 3 while the negative-pressure control unit 230 on the low-pressure side is provided at the other end of the liquid ejection head 3. In this case, liquid flows in a common supply flow path 211 and a common recovery flow path 212 (see FIGS. 5 and 6A later described) extended along the longitudinal axis of the liquid ejection head 3, in opposite directions to each other. This structure facilitates heat exchange between the common supply flow path 211 and common recovery flow path 212 to reduce differences in temperature within the common supply flow path 211. This can minimize differences in temperature between the plural recording element substrates 10 provided along the common supply flow path 211, preventing uneven recording due to such temperature differences.

Next, the flow path member 210 of the liquid ejection unit 300 is described in detail. As illustrated in FIG. 3, the flow path member 210 is composed of the first flow path member 50 and the second flow path member 60 laid on each other. The flow path member 210 distributes liquid supplied from the liquid supply units 220, to the respective ejection modules 200. The flow path member 210 also serves to return to the liquid supply units 220, liquid circulated from the ejection modules 200.

Within the second flow path member 60 of the flow path member 210, the common supply flow path 211 and common recovery flow path 212 are formed. The second flow path member 60 serves to ensure the rigidity of the liquid ejection head 3. The material of the second flow path member 60 therefore, preferably has a sufficient corrosion resistance to liquid and a high mechanical strength. Specifically, the second flow path member 60 is preferably made of SUS, Ti, alumina, or the like.

Figure 4A:
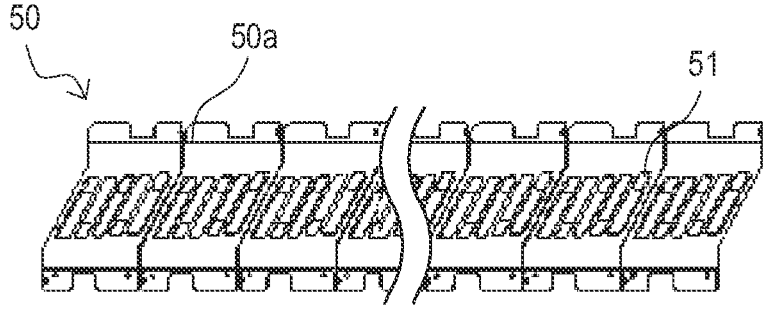
FIGS. 4A, 4B, 4C, 4D, and 4E are schematic diagrams for explaining a configuration of a flow path member.
Figure 4B:
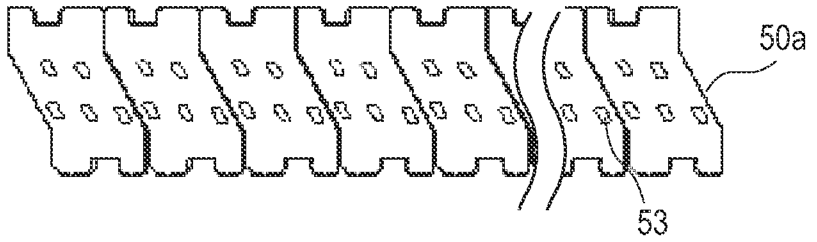
Figure 4C:
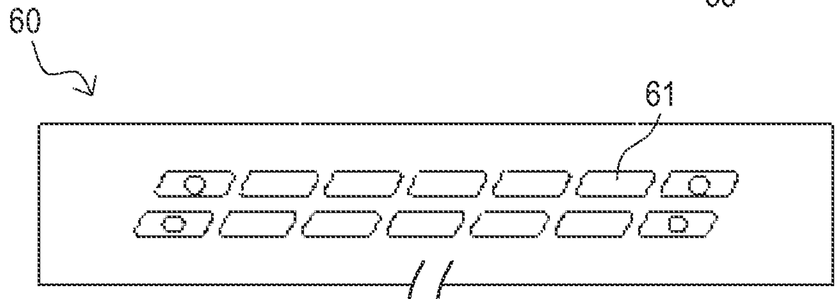
Figure 4D:
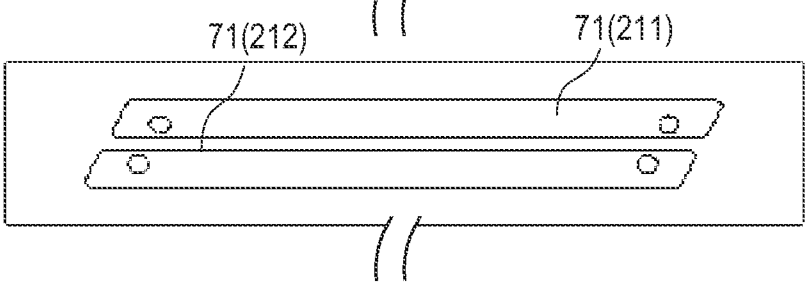
Figure 4E:
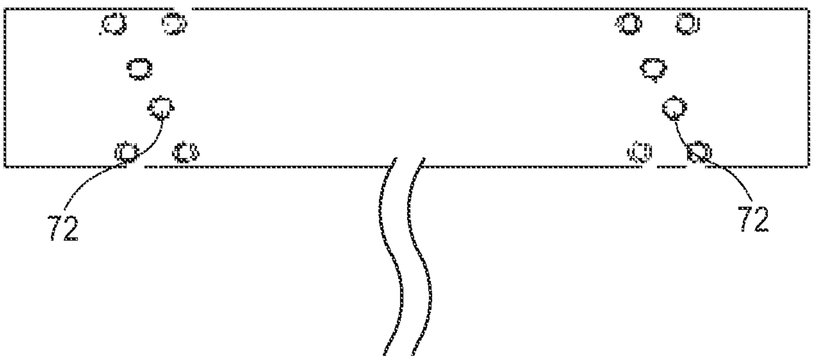

FIGS. 4A to 4E are schematic diagrams for explaining a configuration of the flow path member 210. FIG. 4A illustrates a face of the first flow path member 50 on which the plural ejection modules 200 are to be mounted. FIG. 4B illustrates a face of the first flow path member 50 to be abutted on the second flow path member 60. FIG. 4C illustrates a face of the second flow path member 60 to be abutted on the first flow path member 50. FIG. 4D illustrates a section of the second flow path member 60 at the center of its thickness. FIG. 4E illustrates a face of the second flow path member 60 to be abutted on the liquid supply units 220.

As illustrated in FIG. 4A, the first flow path member 50 includes plural members **50*a* corresponding to the respective ejection modules 200. These members 50*a* are arranged next to each other. With such a block structure, the number of arranged members 50*a* determines the length of the liquid ejection head 3. This structure is therefore, preferably applied particularly to such a comparatively long-scale liquid ejection head that accommodates the length of B2-sized or longer media, for example. Communication ports 51 of the first flow path member 50 communicate with the ejection modules 200**.

As illustrated in FIG. 4B, the first flow path member 50 includes plural individual communication ports 53. As illustrated in FIG. 4C, the second flow path member 60 includes plural communication ports 61. The individual communication ports 53 are arranged in rows along the longitudinal axis of the first flow path member 50. The communication ports 61 are arranged in rows along the longitudinal axis of the second flow path member 60. In this example, the individual communication ports 53 are arranged in two rows, and the communication ports 61 are also arranged in two rows. Each communication port 61 is located corresponding to two or three individual communication ports 53. Each communication port 61 communicates with the corresponding individual communication ports 53.

As illustrated in FIG. 4D, the second flow path member 60 includes two common flow path grooves 71. The common flow path grooves 71 are located in parallel and are both extended along the longitudinal axis of the second flow path member 60. One of the common flow path grooves 71 is located corresponding to one of the rows of the individual communication ports 53 and one of the rows of the communication ports 61. The other common flow path groove 71 is located corresponding to the other row of the individual communication ports 53 and the other row of the communication ports 61.

As illustrated in FIG. 4E, the second flow path member 60 includes plural communication ports 72 at both ends thereof. The both ends of each common flow path groove 71 communicate with the communication ports 72 provided at the corresponding positions. Each common flow path groove 71 is configured such that liquid can flow from one end to the other end. One of the common flow path grooves 71 constitutes the common supply flow path 211, and the other common flow path groove 71 constitutes the common recovery flow path 212 (see FIGS. 5 and 6A described later).

Figure 5:
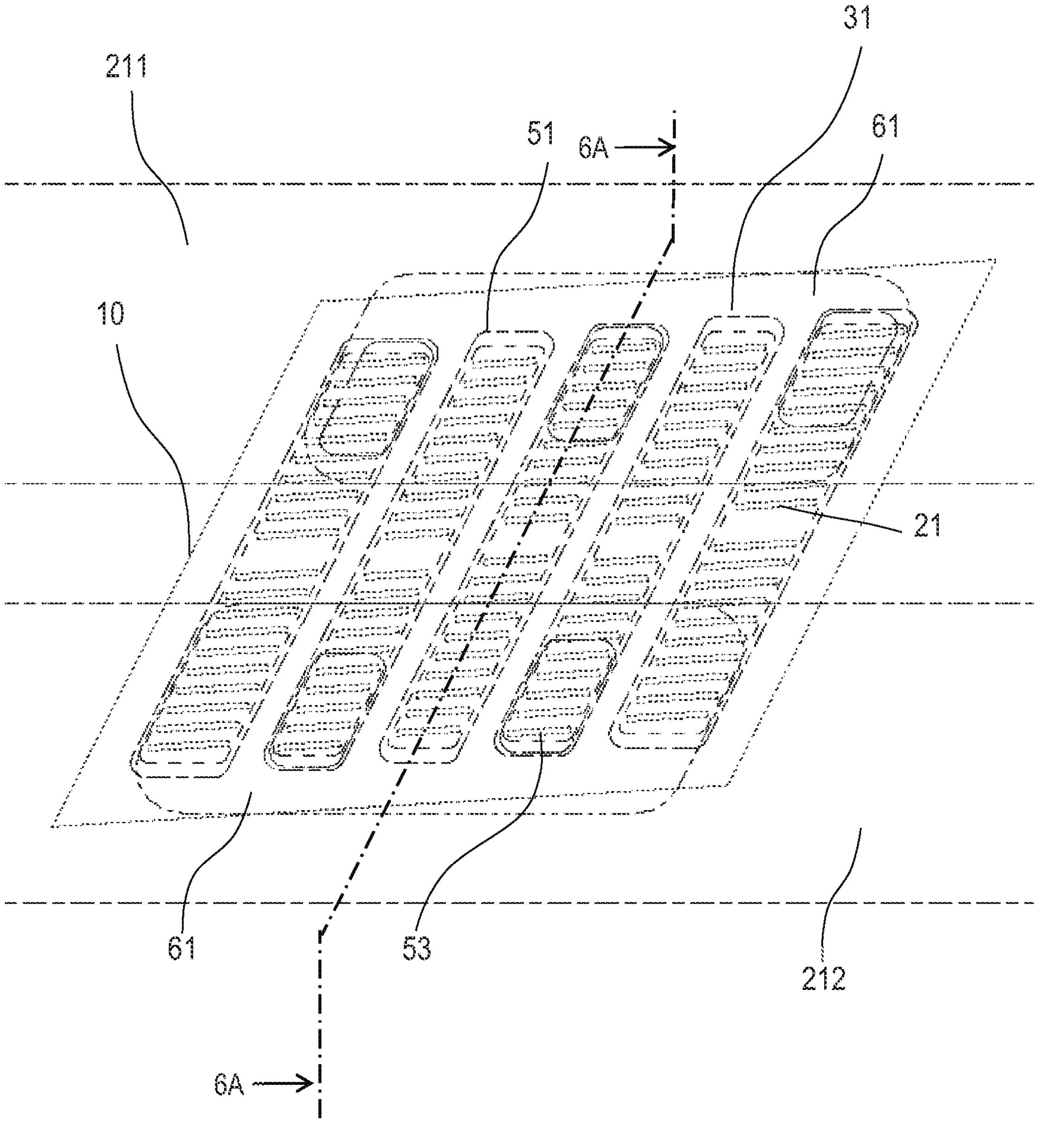
FIG. 5 is a transparent view illustrating a fluidic coupling structure between a recording element substrate and the flow path member.

FIG. 5 is a transparent view illustrating a fluidic coupling structure between each recording element substrate 10 and the flow path member 210. As illustrated in FIG. 5, a pair of the common supply flow path 211 and common recovery flow path 212 are provided within the flow path member 210. The common supply flow path 211 and the common recovery flow path 212 are located in parallel and are both extended along the longitudinal axis of the liquid ejection head 3. A liquid supply route is formed in which the communication ports 72 of the second flow path member 60 communicate with the communication ports 51 of the first flow path member 50 through the common supply flow path 211. In a similar manner, a liquid recovery route is formed in which the communication ports 72 of the second flow path member 60 communicate with the communication ports 51 of the first flow path member 50 through the common recovery flow path 212. The liquid supply route further communicates with openings 21 of the recording element substrate 10 through liquid supply ports 31.

Figure 6A:
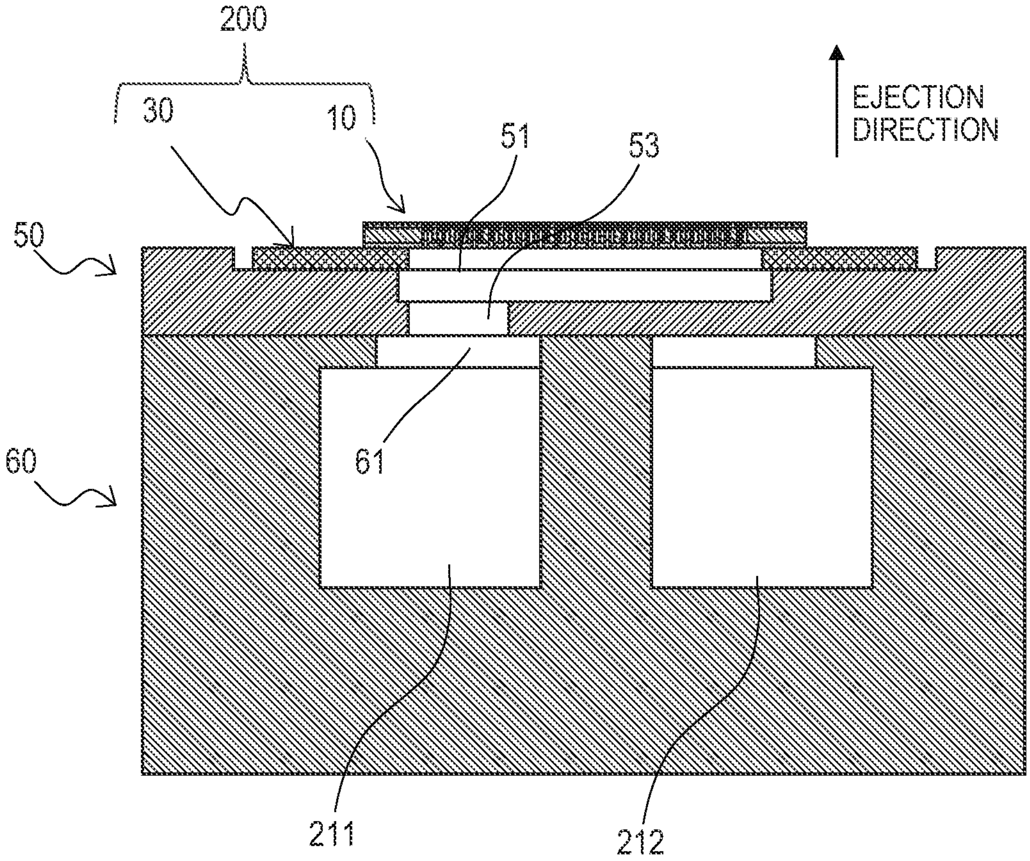
FIGS. 6A and 6B are diagrams illustrating a cross-section of the fluidic coupling structure illustrated in FIG. 5.
Figure 6B:
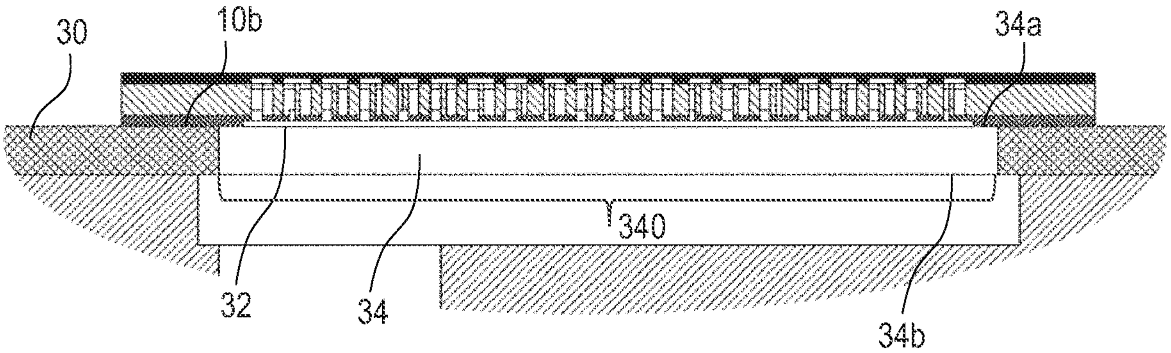

FIGS. 6A and 6B are diagrams illustrating a cross-section of the fluidic coupling structure illustrated in FIG. 5. FIG. 6A is a diagram illustrating a cross section along a line 6A-6A in FIG. 5. FIG. 6B is a partial enlarged diagram of FIG. 6A. As illustrated in FIG. 6A, the first flow path member 50 and the second flow path member 60 are laid on each other. On the upper surface of the first flow path member 50, a support member 30 is provided. The support member 30 includes the liquid supply ports. The support member 30 supports the recording element substrate 10. The common supply flow path 211 is fluidically coupled to the ejection module 200 through the communication port 61, individual communication port 53, and communication port 51.

Figure 8A:
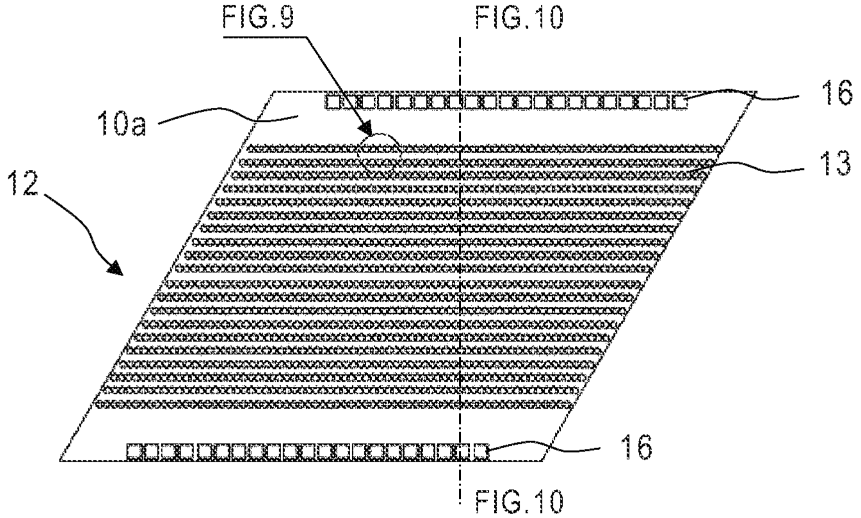
FIGS. 8A, 8B, and 8C are diagrams for explaining a configuration of the recording element substrate.

Each recording element substrate 10 includes plural ejection orifice rows each having plural ejection orifices 13 arranged in rows (see FIG. 8A). In the recording element substrate 10, flow paths communicating with the respective ejection orifices 13 are formed. The recording element substrate 10 is configured to supply and discharge (recover) liquid. The common supply flow path 211 is fluidically coupled to the negative-pressure control unit 230 on the high-pressure side, and the common recovery flow path 212 is fluidically coupled to the negative-pressure control unit 230 on the low-pressure side. Liquid in the common supply flow path 211 flows in front of the ejection orifices 13 of the recording element substrate 10 to the common recovery flow path 212. In the embodiment, the common supply flow path 211 commonly supplies liquid to the plural ejection orifice rows of the recording element substrates 10.

As illustrated in FIG. 6B, the support member 30 is joined to the face (a second face 10*b*) of the recording element substrate 10 in which the openings 21 (see FIG. 8C) are formed. The support member 30 forms a direction change flow path 34 with the recording element substrate 10. The direction change flow path 34 is transverse to the common supply flow path 211 and extends along the second face 10*b* of the recording element substrate 10. The direction change flow path 34 includes a body portion 340 and a grooved flow path 32. The body portion 340 includes a first wall face 34*a* and a second wall face 34*b* facing the first wall face 34*a*. The first wall face 34*a* is located on the ejection orifice side, and the second wall face 34*b* is located on the liquid supply port side. The first wall face 34*a* is a part of the second face 10*b* of the recording element substrate 10. The openings 21 (see FIG. 8C) for supplying liquid to liquid supply paths 18 (see FIG. 9) are formed in the first wall face 34*a*. The grooved flow path 32 extends in the first wall face 34*a*, in the same direction that the direction change flow path 34 (or the body portion 340) extends. The grooved flow path 32 is described in detail later.

Description of Ejection Module

Figure 7A:
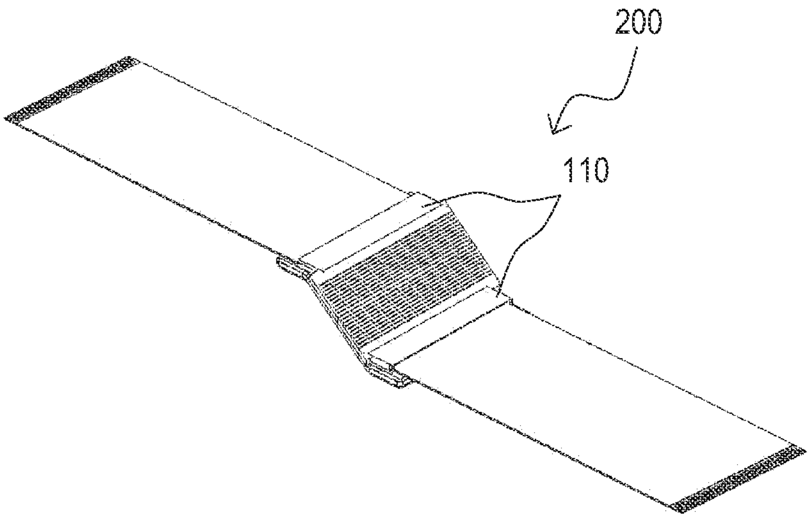
FIGS. 7A and 7B are diagrams for explaining a configuration of an ejection module.
Figure 7B:
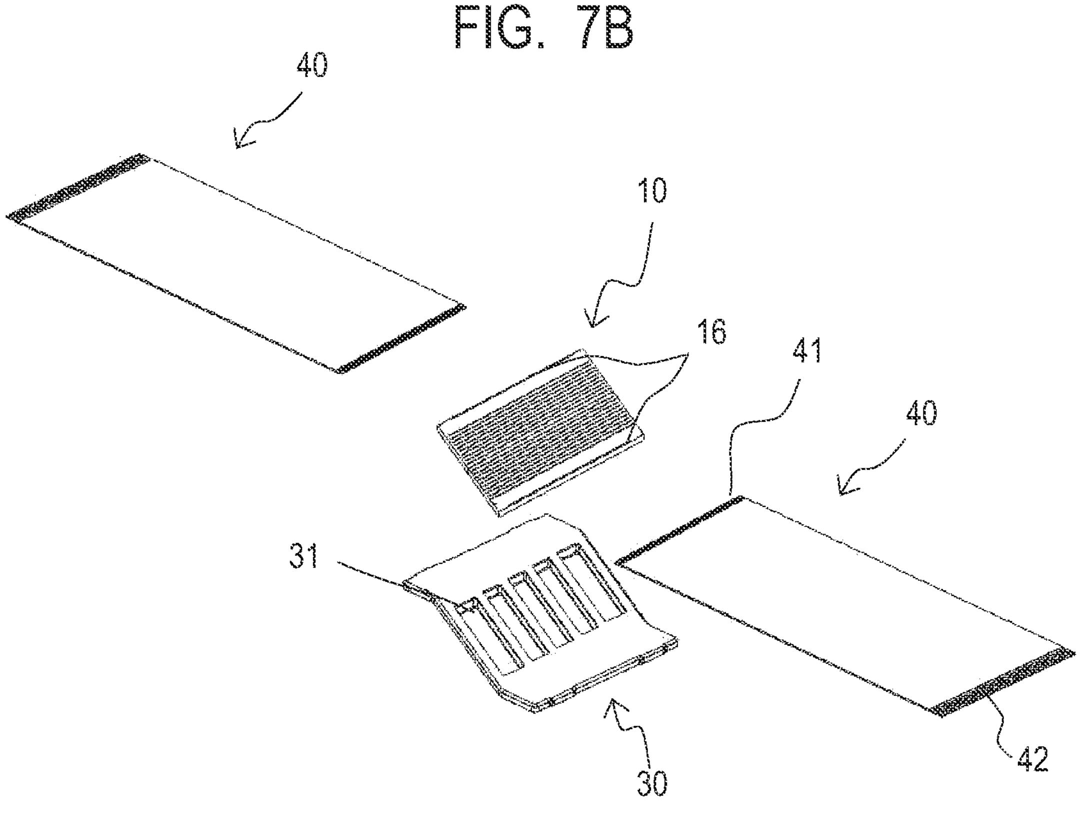

FIGS. 7A and 7B are diagrams for explaining a configuration of the ejection module 200. FIG. 7A is a perspective view of the ejection module 200, and FIG. 7B is an exploded view thereof. The ejection module 200 includes the recording element substrate 10, support member 30, and two flexible wiring boards 40. At each end of the recording element substrate 10, a terminal 16 is formed. At an end of each flexible wiring board 40, a terminal 41 is provided, and at the other end, a terminal 42 is provided.

The method of manufacturing the ejection module 200 is briefly described. Firstly, the recording element substrate 10 and flexible wiring boards 40 are bonded to the support member 30 provided with the liquid supply ports 31 in advance. Then, the terminals 16 at both ends of the recording element substrate 10 are electrically coupled to the terminals 41 of the respective flexible wiring boards 40 by wire bonding. Lastly, the wire-bonding portions (an electric coupling part) are covered and sealed with a sealing material 110.

The other terminals 42 of the flexible wiring boards 40 are electrically coupled to coupling terminals of the respective electric wiring boards 90 illustrated in FIG. 3. The support member 30 serves as a support that supports the recording element substrate 10 and as a flow path member fluidically coupling the recording element substrate 10 and the flow path member 210 illustrated in FIG. 3. The material of the support member 30 preferably has a high flatness and can be joined to the recording element substrate 10 with sufficiently high reliability. Preferably, the support member 30 is made of alumina or a resin material, for example.

Description of Recording Element Substrate Structure

Figure 8B:
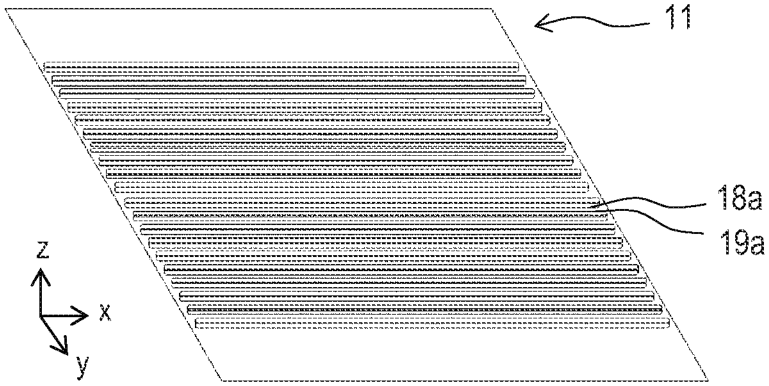
Figure 8C:
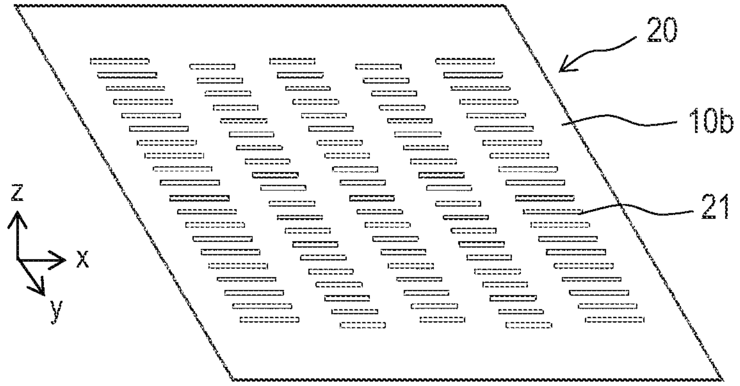

FIGS. 8A to 8C are diagrams for explaining a configuration of the recording element substrate 10. FIG. 8A is a schematic diagram of an ejection orifice forming member 12 forming the ejection orifices 13. FIG. 8B is a schematic diagram of a substrate 11 forming the liquid supply paths 18 and liquid recovery paths 19. FIG. 8C is a schematic diagram of a cover plate 20. FIG. 8B illustrates a surface of the substrate 11 to be joined to the cover plate 20. In FIGS. 8A to 8C, x, y, and z directions are orthogonal to each other.

The recording element substrate 10 is composed of the ejection orifice forming member 12, substrate 11, and cover plate 20. The ejection orifice forming member 12 constitutes a first face 10*a* of the recording element substrate 10. The cover plate 20 constitutes the second face 10*b* of the recording element substrate 10. The second face 10*b* is the opposite surface to the first face 10*a*.

As illustrated in FIG. 8A, the ejection orifice forming member 12 includes the plural ejection orifice rows in each of which the plural ejection orifices 13 are arranged along the x direction. In this example, the number of ejection orifice rows is 20. In the following description, the direction that the ejection orifice rows extend (the row direction of ejection orifices) is referred to as an "ejection orifice row direction". As illustrated in FIG. 8B, in the substrate 11, grooves 18*a* constituting the liquid supply paths 18 and grooves 19*a* constituting the liquid recovery paths 19 are provided alternately and are extended along the ejection orifice row direction. As illustrated in FIG. 8C, the cover plate 20 includes the plural openings 21 in rows along the ejection orifice row direction (the x direction). The substrate 11 and cover plate 20 are joined to constitute the liquid supply paths 18 and the liquid recovery paths 19. The plural openings 21 communicate with the liquid supply paths 18.

Figure 9:
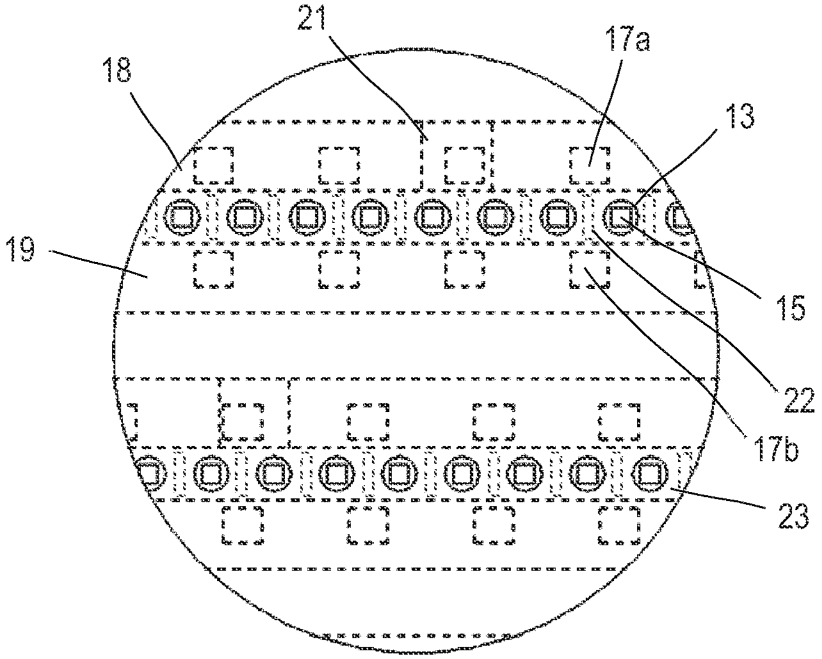
FIG. 9 is a diagram for explaining a structure of a flow path part of the recording element substrate that communicates with ejection orifices.

FIGS. 8A, 9, and 8C are diagrams for explaining the structure of the flow path part of the recording element substrate 10 that communicates with the ejection orifices 13. FIG. 8A is a schematic diagram illustrating a face of the ejection orifice forming member 12 in which the ejection orifices 13 are formed. FIG. 9 is an enlarged diagram of a portion indicated by 9 in FIG. 8A. FIG. 8C is a schematic diagram illustrating a face of the cover plate 20 in which the openings 21 are formed. In FIGS. 8A and 9, the openings 21 are represented by rectangles (dashed lines) for understanding of the relative positions of the openings 21 of the cover plate 20 to the ejection orifice forming member 12.

As illustrated in FIGS. 8A and 9, the recording element substrate 10 includes plural liquid chambers 23 communicating with the liquid supply paths 18. The liquid chambers 23 are also referred to as pressure chambers. The liquid chambers 23 are isolated from each other with partitions 22. The ejection orifices 13 are provided corresponding to the respective liquid chambers 23 and communicate with the corresponding liquid chambers 23. In each liquid chamber 23, a recording element 15 is provided. The recording element 15 is an energy generating element that gives energy to liquid for ejection. The recording element 15 may be a heating element that causes liquid to bubble with heat energy, for example. The recording element 15 is electrically coupled to the corresponding terminal 16 through electric wiring (not illustrated).

The control circuit of the recording apparatus 1000 supplies a pulse signal to the recording element 15 through the corresponding electric wiring board 90 (see FIG. 3) and flexible wiring board 40 (see FIG. 7B). Based on the pulse signal, the recording element 15 generates heat and boils liquid. The force of bubbling due to boiling is used to eject liquid through the ejection orifice 13.

On the respective sides of each ejection orifice row, the liquid supply path 18 and the liquid recovery path 19 are extended in the ejection orifice row direction. The liquid supply path 18 communicates with the ejection orifices 13 through supply ports 17*a* (see FIG. 10 described later). The liquid recovery path 19 communicates with the ejection orifices 13 through recovery ports 17*b* (see FIG. 10 described later).

As illustrated in FIG. 8C, the cover plate 20 is provided with the plural openings 21 communicating with the liquid supply paths 18 and liquid recovery paths 19. In the example of FIG. 8C, each liquid supply path 18 corresponds to two openings 21, and each liquid recovery path 19 corresponds to one opening 21. As illustrated in FIG. 9, the openings 21 of the cover plate 20 communicate with the plural communication ports 51 illustrated in FIG. 5.

The cover plate 20 partially forms walls of the liquid supply paths 18 and liquid recovery paths 19. The material of the cover plate 20 therefore, preferably has a sufficient corrosion resistance to liquid. To prevent undesired color mixing, the opening shape and opening position of the openings 21 require a high degree of accuracy. It is therefore preferable to use a photosensitive resin material or silicon (Si) as the material of the cover plate 20 and form the openings 21 with a photolithography process. The cover plate 20 is configured to change the pitch of flow paths with the openings 21. In terms of pressure loss, the cover plate 20 is preferably thin. In this case, the cover plate 20 is preferably composed of a film member, for example.

Figure 10:
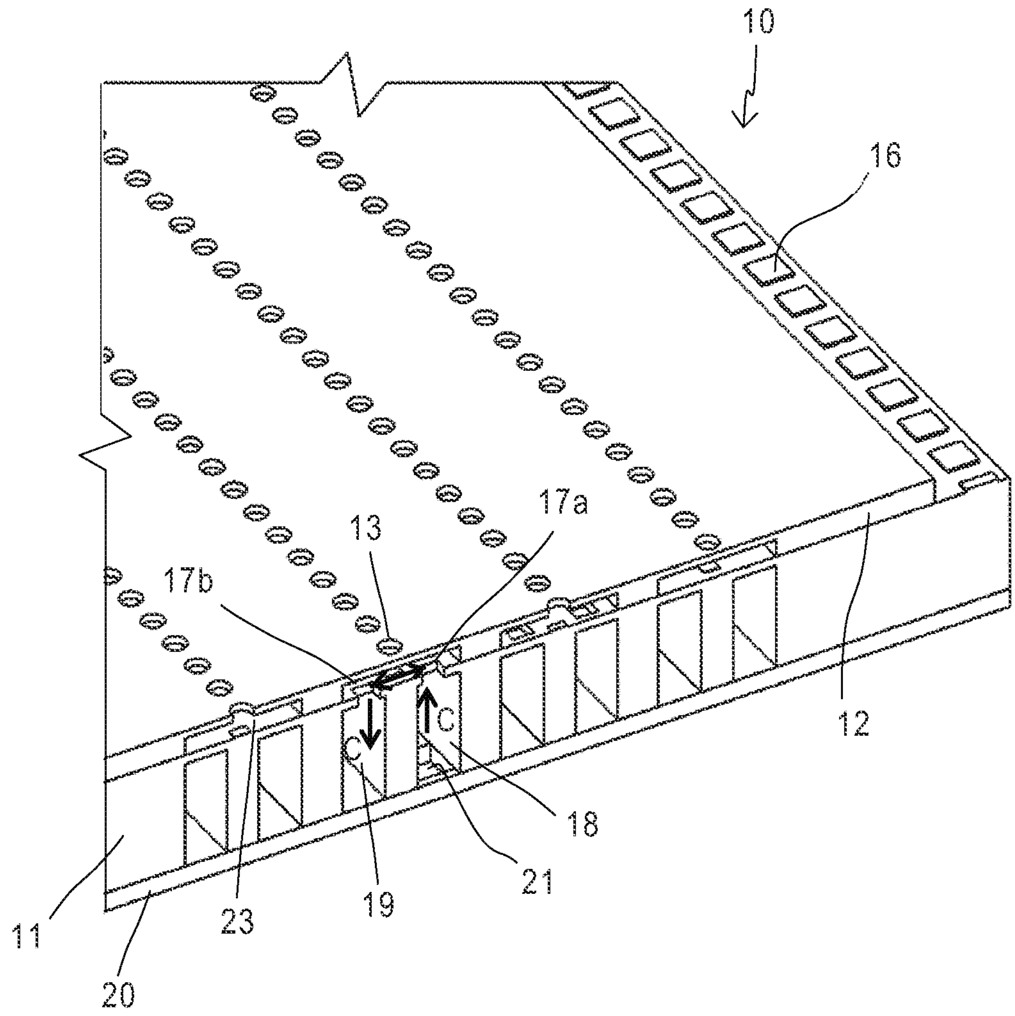
FIG. 10 is a perspective view schematically illustrating a cross-section along a line FIG. 10-FIG. 10 of FIG. 8A.

Next, the liquid flow within the recording element substrate 10 is described. FIG. 10 is a perspective view schematically illustrating a cross-section along a line FIG. 10-FIG. 10 in FIG. 8A. The substrate 11 and the ejection orifice forming member 12 are laid on each other, and the cover plate 20 is joined to the back side of the substrate 11. In one face's side of the substrate 11, the recording elements 15 are formed. In the other face's side of the substrate 11, the grooves 18*a* and the grooves 19*a* are formed. The cover plate 20 is joined to the other face of the substrate 11 to form the liquid supply paths 18 and liquid recovery paths 19.

The liquid supply paths 18 are fluidically coupled to the common supply flow path 211 while the liquid recovery paths 19 are fluidically coupled to the common recovery flow path 212. A differential pressure is produced between the liquid supply paths 18 and liquid recovery paths 19. During the process of the liquid ejection head 3 ejecting liquid for recording, the differential pressure creates a flow (a circulation) of liquid indicated by arrows C at an ejection orifice 13 that is not performing an ejecting operation. To be specific, the liquid within the liquid supply path 18 flows through the supply port 17*a*, pressure chamber 23, and recovery port 17*b* to the liquid recovery path 19. This flow can recover liquid with its viscosity increased due to vaporization from the ejection orifice 13, bubbles, foreign substances, or the like to the liquid recovery path 19. Furthermore, such a flow can reduce the increase in liquid viscosity in the ejection orifice 13 and liquid chamber 23.

Liquid recovered to the liquid recovery path 19 flows through the opening 21 of the cover plate 20 and the liquid supply port 31 of the support member 30 (see FIG. 7B) toward the communication port 51 within the flow path member 210. Then, liquid sequentially passes through the communication port 51 and common recovery flow path 212 to be recovered to the supply route of the recording apparatus 1000 at the end.

Description of Relationship Between Grooved Flow Path and Bubble

Figure 11:
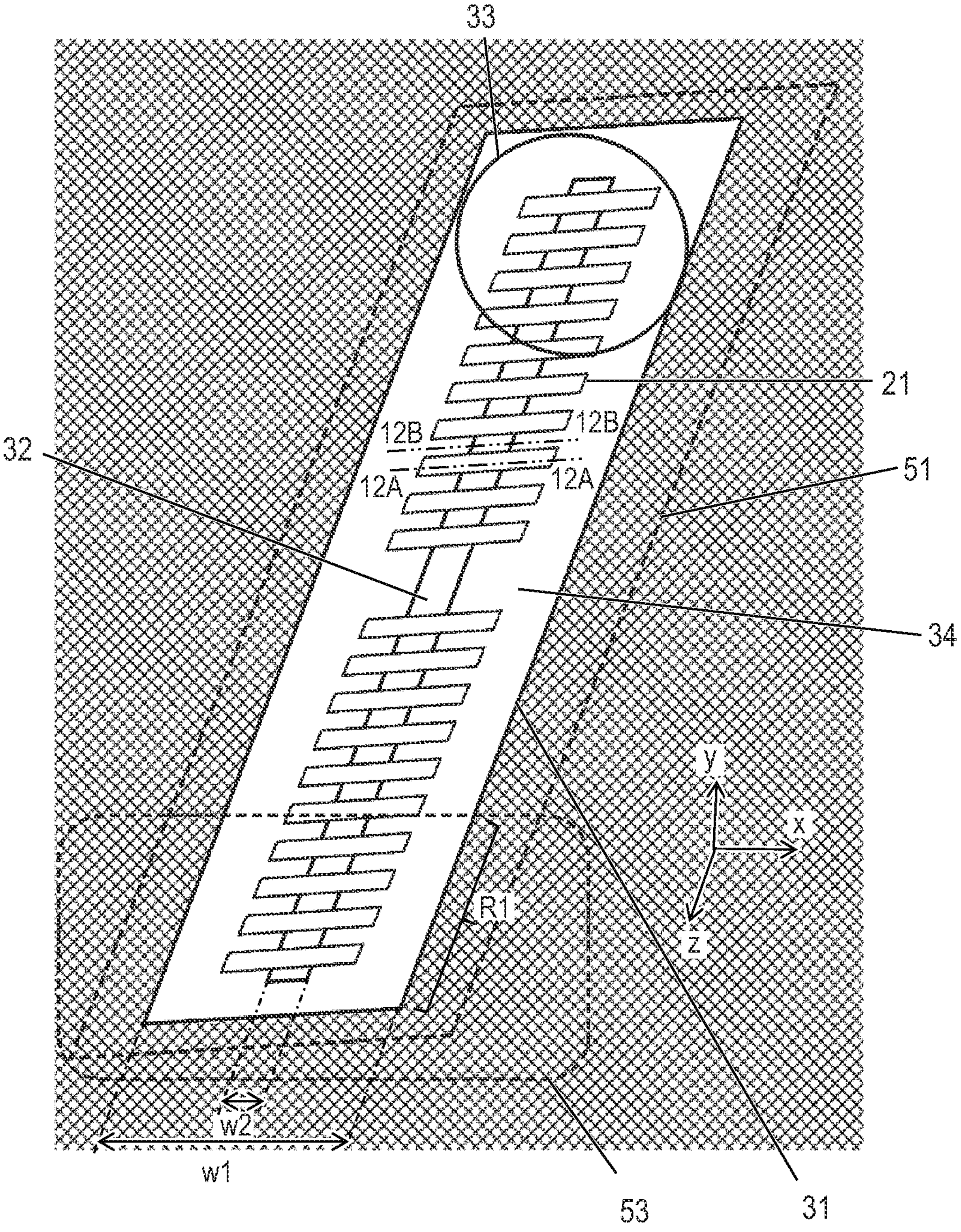
FIG. 11 is a schematic diagram illustrating an air bubble produced in a direction change flow path.

FIG. 11 is a schematic diagram illustrating an air bubble produced in the direction change flow path 34. In FIG. 11, x, y, and z directions are orthogonal to each other. The x direction is a direction that the ejection orifice rows extend. The liquid supply paths 18 and liquid recovery paths 19 both extend in the x direction, which are not illustrated in FIG. 11. The direction from the front to back side of the page of FIG. 11 (the z direction) is the direction that liquid is ejected.

The direction change flow path 34 extends in a direction (the y direction herein) transverse to the liquid supply paths 18. Each liquid supply path 18 communicates with the direction change flow path 34 through the corresponding opening 21. The direction change flow path 34 communicates with the individual communication port 53 through the communication port 51 (see FIG. 6A). In the view of the direction change flow path 34 from the first flow path member 50's side, the opening size of the communication port 51 is greater than the direction change flow path 34, and the opening size of the individual communication port 53 is smaller than the opening size of the communication port 51.

The direction change flow path 34 is closed at an end. The individual communication port 53 is located at the opposite end to a forward end of the direction change flow path 34. The individual communication port 53 is provided in the second wall face **34*b* (see FIG. 6B) of the direction change flow path 34. In the first wall face 34*a* of the direction change flow path 34, the plural openings 21 are located in rows along the longitudinal axis of the direction change flow path 34 (in the y direction). Liquid is supplied from the individual communication port 53 to the direction change flow path 34 and flows toward the respective openings 21**.

The grooved flow path 32 extends in the direction that the direction change flow path 34 extends (along the row of the openings 21). In this example, the grooved flow path 32 extends in the direction that the direction change flow path 34 extends, from a region R1 of the first wall face **34*a* that faces the individual communication port 53. The region R1 may be a region obtained by projecting the individual communication port 53 onto the first wall face 34*a* in the direction vertical to the first wall face 34*a*, for example. The grooved flow path 32 fluidically connects the openings 21 and extends past the end of the row of the openings 21 (a region of the direction change flow path 34 at the forward end). The forward end of the direction change flow path 34** is a portion located at the most downstream side in the direction of liquid flow, which is a closed end herein.

Width w2 (the dimension in the x direction) of the grooved flow path 32 is narrower than width w1 (the dimension in the x direction) of the direction change flow path 34. The grooved flow path 32 may be formed by mechanical processing or by photolithography and etching. In the case of forming the grooved flow path 32 using photolithography, the cover plate 20 is made of Si or the like, for example. The grooved flow path 32 can thereby be formed at a highly-accurate position relative to the openings 21.

Figure 12A:
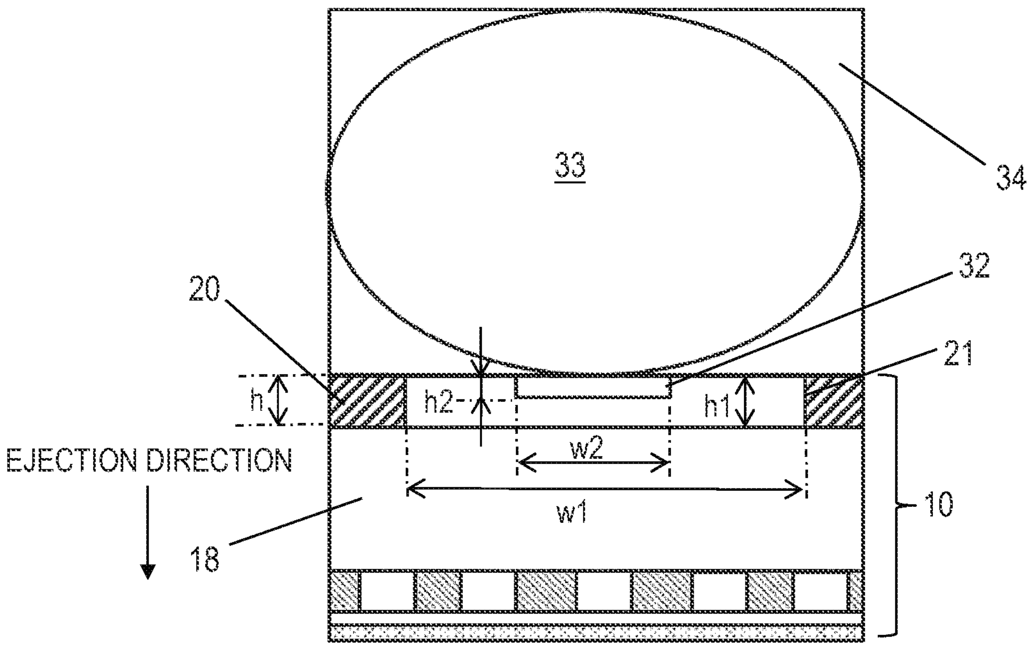
FIGS. 12A and 12B are diagrams for explaining the positional relationship between an air bubble in the direction change flow path and a grooved flow path.
Figure 12B:
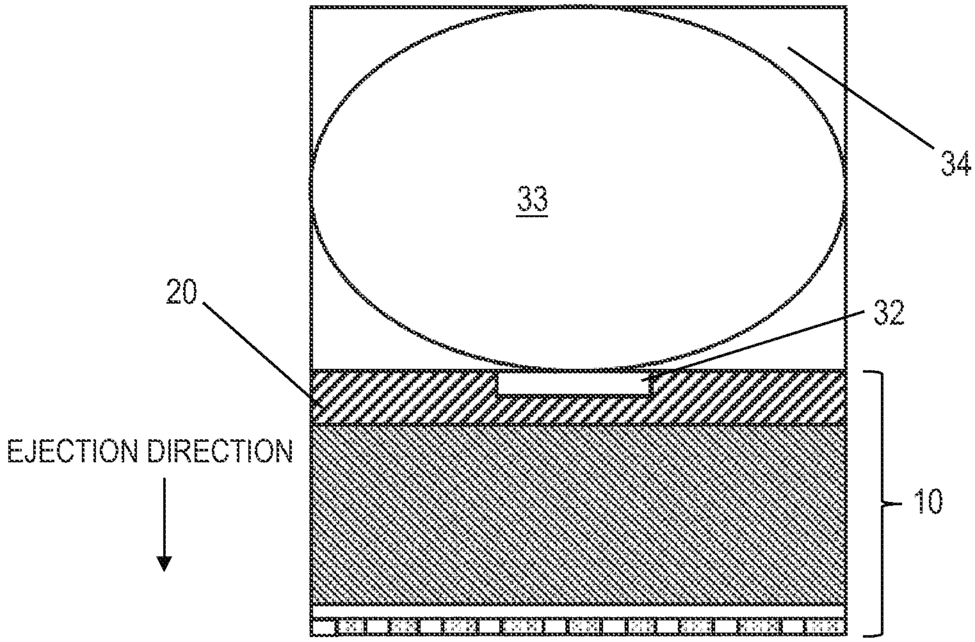

During the process of filling the direction change flow path 34 with liquid, an air bubble 33 is likely to form at the forward end of the direction change flow path 34. FIGS. 12A and 12B are diagrams for explaining the positional relationship between the air bubble 33 within the direction change flow path 34 and the grooved flow path 32. FIG. 12A is a schematic diagram illustrating a cross-section along a line 12A-12A of FIG. 11. FIG. 12B is a schematic diagram illustrating a cross-section along a line 12B-12B of FIG. 11.

Height h2 of the grooved flow path 32, height h1 of the opening 21, and thickness h of the cover plate 20 have the following relationship of $h2<h1=h$. The grooved flow path 32 is configured to allow liquid to flow using capillary action due to liquid's surface tension. For example, the width w2 of the grooved flow path 32 may be 50 μm, and the height h2 may be 50 μm. For example, the width and height of the direction change flow path 34 may be both 1 mm. When the air bubble 33 blocks the direction change flow path 34, the grooved flow path 32 is small enough compared to the size of the air bubble 33, and the air bubble 33 therefore cannot block the grooved flow path 32.

Figure 13A:
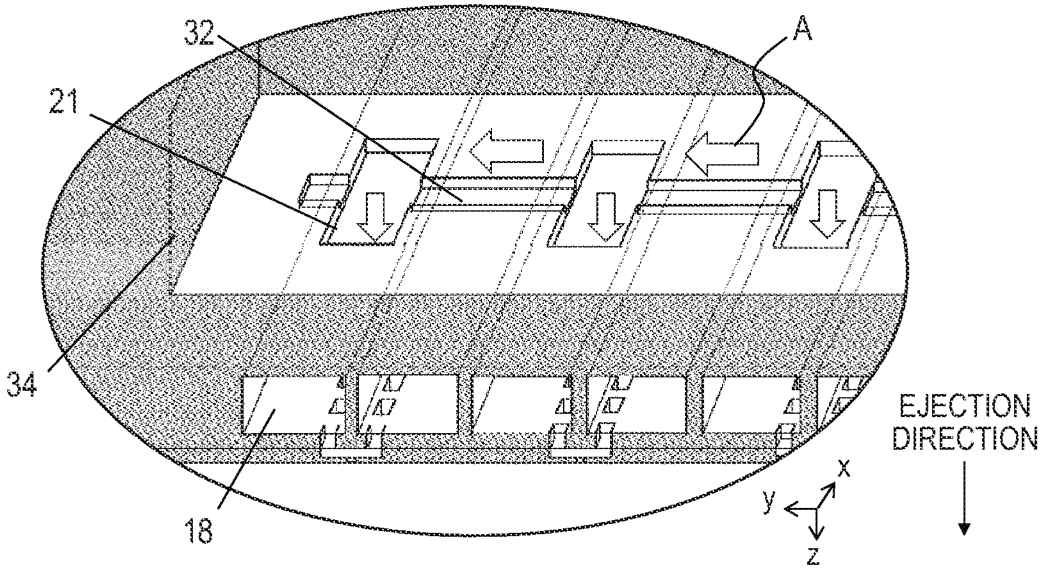
FIGS. 13A and 13B are diagrams for explaining a liquid flow through openings.
Figure 13B:
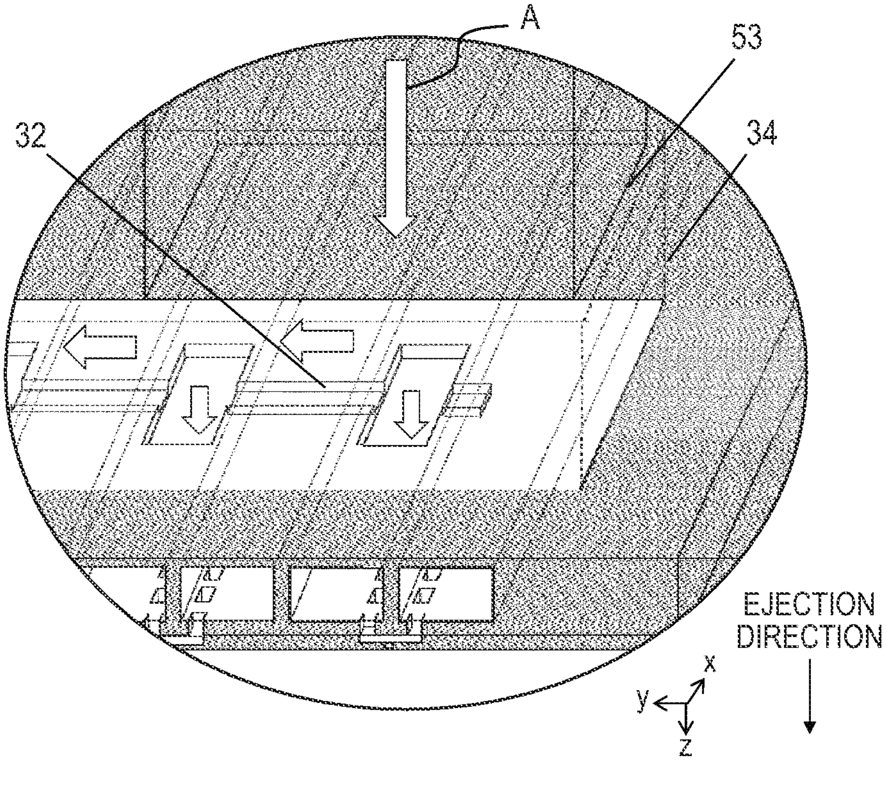

FIGS. 13A and 13B are diagrams for explaining a liquid flow through the openings 21. FIG. 13A is a schematic diagram illustrating a liquid flow in the forward end's side of the direction change flow path 34. FIG. 13B is a schematic diagram illustrating a liquid flow in the individual communication port 53's side of the direction change flow path 34. FIGS. 13A and 13B both illustrate the direction change flow path 34 as seen from the first flow path member 50's side.

In the direction change flow path 34, liquid supplied from the individual communication port 53 is sequentially supplied to the openings 21, starting from the opening 21 that is the closest to the region R1 facing the individual communication port 53 to the opening 21 that is the farthest from the region R1 in the horizontal direction, or in the y direction (see white arrows). Liquid is supplied through each opening 21 to the corresponding liquid supply path 18. Then, liquid is supplied from the liquid supply path 18 through the supply ports **17*a* to the ejection orifices 13**.

According to the liquid ejection head 3 of the embodiment, even when the air bubble 33 blocks the direction change flow path 34, liquid flows through the grooved flow path 32 by capillary action. The grooved flow path 32 is able to supply liquid to each opening 21. Liquid thereby continues to be supplied to the openings 21. For example, when the air bubble 33 stays at the forward end of the direction change flow path 34 and blocks some openings 21 as illustrated in FIG. 11, liquid can be supplied to the blocked openings 21 through the grooved flow path 32. In addition, when the air bubble 33 is produced around the center of the direction change flow path 34, liquid can be supplied to space on the opposite side of the air bubble 33 through the grooved flow path 32. Liquid therefore can continue to be supplied to the openings 21 in such a manner, preventing the ejection orifices 13 from failing to eject liquid due to the air bubble 33, for example.

In the embodiment, each direction change flow path 34 is provided with one grooved flow path 32. However, the disclosure is not limited to this configuration. Each direction change flow path 34 is provided with plural grooved flow paths 32. For example, the plural grooved flow paths 32 may be provided in parallel.

The grooved flow path 32 fluidically connects all the openings 21 in the embodiment. However, the disclosure is not limited to this configuration. For example, the grooved flow path 32 may communicate with at least one of the plural openings 21. In this case, the grooved flow path 32 may communicate with the opening 21 that is the farthest from the individual communication port 53, for example.

Figure 14A:
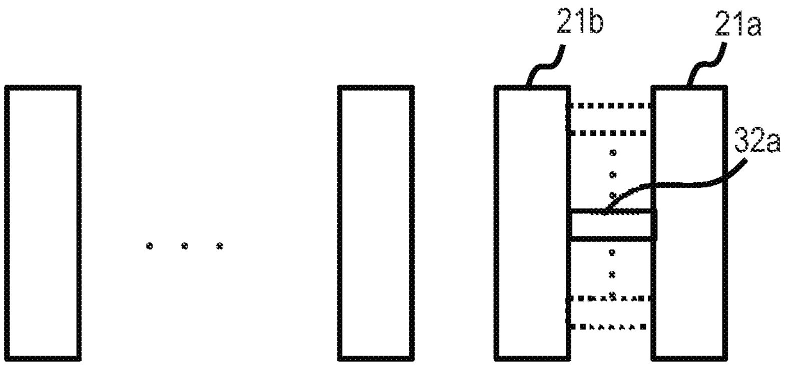
FIGS. 14A, 14B, and 14C are schematic diagrams illustrating configuration examples of grooved flow paths fluidically connecting adjacent openings.
Figure 14B:
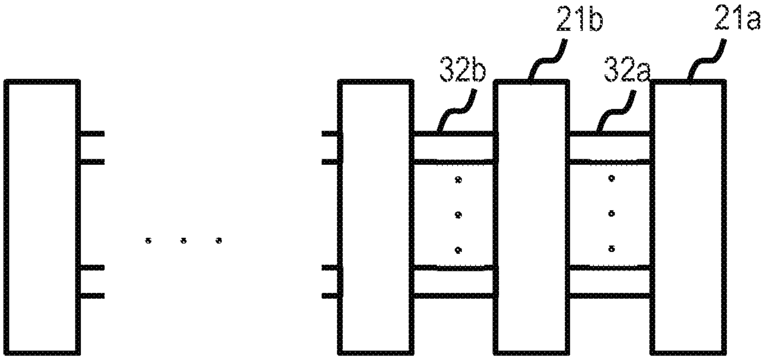
Figure 14C:
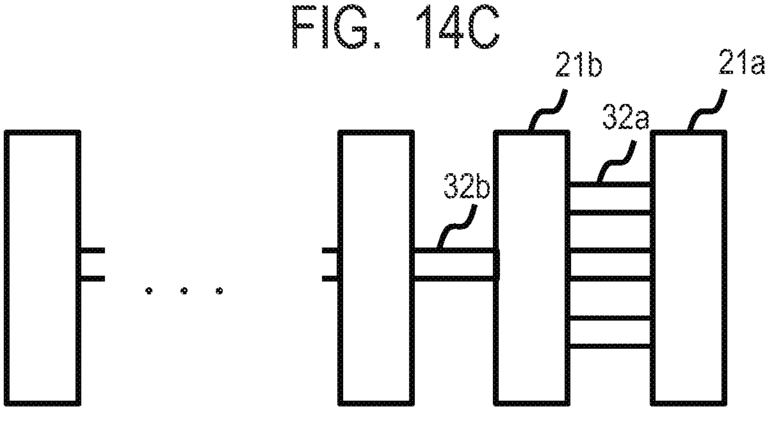

FIGS. 14A to 14C are schematic diagrams for explaining modifications of the configuration in which the grooved flow path 32 fluidically connects the adjacent openings 21. FIG.

14A illustrates a first modification, FIG. 14B illustrates a second modification, and FIG. 14C illustrates a third modification.

In the first modification illustrated in FIG. 14A, a first grooved flow path 32*a* fluidically connects a first opening 21*a* that is the farthest opening from the individual communication port 53 and a second opening 21*b* that is adjacent to the first opening 21*a*. The openings other than the first and second openings 21*a* and 21*b* do not communicate with any grooved flow path. In this case, the first grooved flow path 32*a* may include plural first grooved flow paths 32*a* as indicated by dashed-line blocks. According to the first modification, the grooved flow paths are effectively located in a region of the direction change flow path 34 where the air bubble 33 is likely to form, that is, a region at the forward end.

The second modification illustrated in FIG. 14B includes, in addition to the configuration of the first modification, second grooved flow paths 32*b* fluidically connecting an opening different from the first opening 21*a* and another opening that is adjacent thereto and is different from the first opening 21*a*. In this modification, all the openings other than the first opening 21*a* are fluidically connected to each other with the second grooved flow paths 32*b*. The numbers of the first and second grooved flow paths 32*a* and 32*b* provided between the adjacent openings are both not less than one. Setting the numbers of the first and second grooved flow paths 32*a* and 32*b* to two or more, for example, ensures that liquid can be supplied to the openings 21 across the entire direction change flow path 34.

The number of first grooved flow paths 32*a* provided between the first and second openings 21*a* and 21*b* may be greater than the number of second grooved flow paths 32*b* provided between an opening different from the first opening 21*a* and another opening that is adjacent thereto and is different from the first opening 21*a*. In the third modification illustrated in FIG. 14C, for example, the number of first grooved flow paths 32*a* is three, and the number of second grooved flow paths 32*b* is one. The grooved flow paths are therefore effectively located in a region of the direction change flow path 34 where the air bubble 33 is likely to form, that is, in a region at the forward end.

Furthermore, the openings 21 may be spaced evenly apart. In this case, the first grooved flow paths 32*a* provided between the first and second openings 21*a* and 21*b* may have a larger total flow path area than the second grooved flow paths 32*b* provided between an opening different from the first opening 21*a* and another opening adjacent thereto. As the total flow path area increases while the capillary action still works, the supply of liquid to the openings increases. It is therefore possible to supply a sufficient amount of liquid to the openings in a region (a region at the forward end) where the air bubble 33 is likely to form.

In the embodiment, the liquid supply route may be provided with a deaeration mechanism that removes air bubbles. Providing such a deaeration mechanism reduces the size of air bubbles remaining in the flow path during the process of circulating liquid. For example, the deaeration mechanism may include a tank temporarily storing liquid to be supplied to the liquid ejection head and depressurize the tank using a vacuum pump or the like.

A liquid ejection head of another modification of the present disclosure includes: a liquid supply path communicating with plural ejection orifices configured to eject liquid; and a flow path that includes in a lateral wall, an opening through which liquid is supplied to the liquid supply path and that extends in a direction transverse to the liquid supply path. The flow path has one closed end and includes in a lateral wall, a grooved flow path communicating with the openings. The grooved flow path supplies liquid to the openings by capillary action. The liquid supply path, flow path, and grooved flow path correspond to the liquid supply path 18, direction change flow path 34, and grooved flow path 32 described in the first embodiment, respectively. According to the liquid ejection head of the modification, liquid can continue to be supplied to the openings even when an air bubble blocks the flow path.

As described above, according to the present disclosure, liquid can continue to be supplied to the openings even when an air bubble blocks the flow path.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-114338, filed Jul. 9, 2021, which is hereby incorporated by reference herein in its entirety.

What is claimed is:

1. A liquid ejection head comprising:

a plurality of ejection orifices configured to eject liquid;

a plurality of liquid chambers communicating with the plurality of ejection orifices one-to-one;

an energy generating element that is provided for each of the plurality of liquid chambers and is configured to apply energy to eject the liquid from each of the plurality of ejection orifices;

a plurality of liquid supply paths that communicate with the plurality of liquid chambers and are configured to supply the liquid to the plurality of liquid chambers;

a direction change flow path that communicates with the plurality of liquid supply paths and extends in a direction transverse to the plurality of liquid supply paths; and a common supply flow path that communicates with the direction change flow path and extends in a direction transverse to the direction change flow path, wherein the direction change flow path includes a body portion and a grooved flow path having a smaller width than the body portion, the body portion includes a first wall face provided with at least one opening through which the liquid is supplied to the plurality of liquid supply paths, and the grooved flow path extends in the first wall face of the body portion along the direction that the body portion extends.

2. The liquid ejection head according to claim 1, wherein the opening comprises a plurality of openings, and the plurality of openings are provided along the direction that the body portion extends.

3. The liquid ejection head according to claim 2, wherein the grooved flow path communicates with at least one of the plurality of openings.

4. The liquid ejection head according to claim 2, wherein the grooved flow path fluidically connects the plurality of openings.

5. The liquid ejection head according to claim 1, wherein the grooved flow path comprises a plurality of grooved flow paths, and the plurality of grooved flow paths are provided in parallel.

6. The liquid ejection head according to claim 1, wherein the body portion includes a second wall face facing the first wall face and is provided with a communication port in the second wall face, the communication port communicating with the common supply flow path.

7. The liquid ejection head according to claim 6, wherein the grooved flow path extends in the direction that the body portion extends, from a region of the first wall face that faces the communication port.

8. The liquid ejection head according to claim 6, wherein the opening comprises a plurality of openings, the plurality of openings are provided along the direction that the body portion extends, and the grooved flow path communicates with the farthest one of the plurality of openings from the communication port.

9. The liquid ejection head according to claim 6, wherein the opening comprises a plurality of openings, the plurality of openings are provided along the direction that the body portion extends, and the grooved flow path includes a first grooved flow path that fluidically connects a first opening and a second opening to each other, the first opening being the farthest one of the plurality of openings from the communication port, the second opening being one of the plurality of openings that is adjacent to the first opening.

10. The liquid ejection head according to claim 9, wherein the first grooved flow path comprises a plurality of first grooved flow paths.

11. The liquid ejection head according to claim 9, wherein the plurality of openings other than the first and second openings do not communicate with the at least one grooved flow path.

12. The liquid ejection head according to claim 9, wherein the grooved flow path includes a second grooved flow path fluidically connecting a third opening and a fourth opening to each other, the third opening being one of the plurality of openings that is different from the first opening, the fourth opening being one of the plurality of openings that is adjacent to the third opening and is different from the first opening.

13. The liquid ejection head according to claim 12, wherein the second grooved flow path comprises a plurality of second grooved flow paths.

14. The liquid ejection head according to claim 12, wherein the number of the first grooved flow path provided between the first and second openings is greater than the number of the second grooved flow path provided between the third and fourth openings.

15. The liquid ejection head according to claim 12, wherein the plurality of openings are spaced evenly apart from each other, and the first grooved flow path provided between the first and second openings has a larger total flow path area than the second grooved flow path provided between the third and fourth openings.

16. The liquid ejection head according to claim 1, wherein the direction change flow path has one closed end.

17. The liquid ejection head according to claim 1, wherein the first wall face is located on the ejection orifices' side.

18. The liquid ejection head according to claim 1, wherein the grooved flow path supplies the liquid to the opening by capillary action.

19. The liquid ejection head according to claim 1, further comprising a liquid recovery path communicating with each of the plurality of liquid chambers, wherein part of the liquid that is supplied to the plurality of ejection orifices from the plurality of liquid supply paths and is not ejected is recovered through the liquid recovery path.

20. The liquid ejection head according to claim 1, further comprising: a recording element substrate including the plurality of liquid chambers and the plurality of liquid supply paths; and a support member forming the direction change flow path with the recording element substrate, wherein the recording element substrate includes a first face and a second face opposite to the first face, the plurality of ejection orifices of the plurality of liquid chambers are provided in the first face, and the at least one opening through which the liquid is supplied to the plurality of liquid supply paths is provided in the second face, and the support member is joined to the second face of the recording element substrate.

21. A liquid ejection head comprising:

a liquid supply path communicating with a plurality of ejection chambers each including an ejection orifice configured to eject liquid; and a flow path that includes in a wall face, an opening through which the liquid is supplied to the liquid supply path and that extends in a direction transverse to the liquid supply path, wherein the flow path has one closed end and includes in the wall face, a grooved flow path communicating with the opening, and the grooved flow path is configured to supply the liquid to the opening by capillary action.

* * * * *